Oct. 10, 1967  T. A. MIDFORD ET AL  3,346,816

OPTICAL ENERGY CONVERTER

Filed April 17, 1964

Inventors
THOMAS A. MIDFORD
RICHARD H. PANTELL
By
Attorney

3,346,816
OPTICAL ENERGY CONVERTER
Thomas Arthur Midford and Richard H. Pantell, London, England, assignors to International Standard Electric Corporation, New York, N.Y., a corporation of Delaware
Filed Apr. 17, 1964, Ser. No. 360,697
Claims priority, application Great Britain, Apr. 23, 1963, 15,942/63
19 Claims. (Cl. 329—144)

This invention relates to apparatus for the detection and amplification of a signal modulating an optical frequency carrier wave.

According to the invention, apparatus for the detection and amplification of a signal modulating an optical frequency carrier wave includes a signal crystal body of piezoelectric semi-conductor material having at least one pair of parallel faces, means for applying a direct current bias potential between the two faces, means for coupling to one of the faces of the body of piezoelectric semiconductor material the modulated optical carrier wave, whereby the inter-action between the wave and the body of piezoelectric semiconductor material produces within the material a photocurrent corresponding to the modulating signal and an acoustically responsive output transducer coupled to the body of piezoelectric semiconductor material to produce an acoustic output corresponding to the modulating signal.

The term "acoustic" as used in this specification relates to a vibration, alteration in pressure, stress, particle displacement or velocity which is propagated in an elastic material. Acoustical frequencies are not limited to audible frequencies, but may range up to, for example, $10^5$ mc/s.

Figure 1:
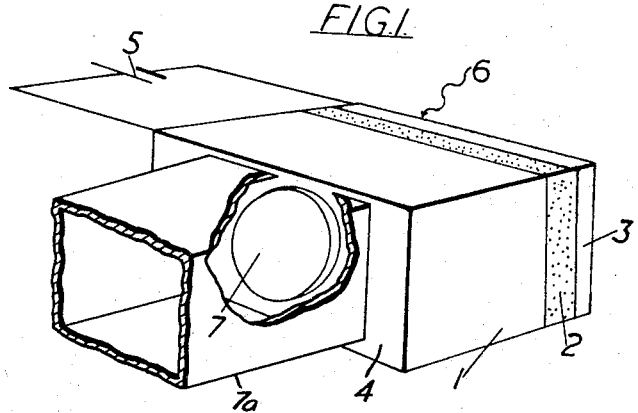
Figure 2:
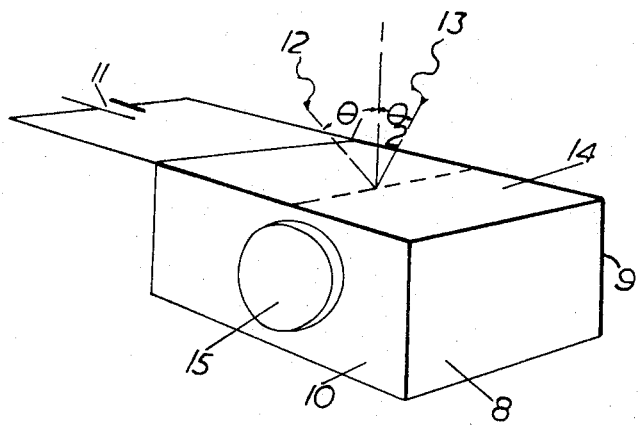

Embodiments of the invention are now described with reference to the drawings accompanying the specification in which FIG. 1 illustrates an optical input acoustic amplifier, and FIG. 2 illustrates an alternative form of optical input acoustic amplifier.

FIGS. 1 and 2 are essentially similar inasmuch as they are optical input acoustic amplifiers, but they have different methods of coupling to the optical input.

The device shown in FIG. 1 has a body of piezoelectric semiconductor material 1, such as cadmium sulphide (CdS). A depletion layer 2, or in some materials a p-i-n junction is formed in one face of the body 1. This depletion layer 2 is a very narrow region of high electric field with a correspondingly short carrier transit time. The light frequency, or the absorption edge of the material, is chosen so that, when placed in a beam of light, most of the incident light is absorbed in the depletion layer 2. A D.C. bias is used to provide an electric field, not only in the depletion layer 2, but also in the body. This D.C. bias is achieved by forming a transparent or semi-transparent electrical contact 3 on the same face as the depletion layer 2, and another electrical contact 4 on the opposite face the two faces being parallel. A D.C. source 5 is then connected across the contacts 3 and 4.

The device is positioned in the beam of light 6, which is incident on and normal to the depletion layer 2, and is modulated by a signal. This light 6 might be the product of a laser, for example.

Inter-action between the light 6 and the depletion layer 2, in the presence of the D.C. bias field, gives rise to a photocurrent proportional to the input signal. This modulated photocurrent excites a growing acoustic wave within the body 1. Amplification of the acoustic wave is achieved by making the D.C. electric field sufficient to cause the charge carriers in the body 1 to drift in the direction of propagation of the acoustic wave faster than the acoustic velocity.

The amplified acoustic wave will correspond to the modulating signal on the optical input 6, and may be detected by any suitable form of transducer, which is schematically indicated at 7 in FIG. 1. One form of transducer is a quartz rod acoustically bonded to the face 4 of the body 1. The acoustic wave is propagated into the rod, and the output is derived by one of several methods, depending on the frequencies involved.

For low frequencies, the quartz rod may be a resonant element, the piezoelectric charges induced therein being coupled out in a conventional manner. For high frequency outputs, the free end of the quartz rod may be used to modulate a microwave cavity schematically indicated at 7a in FIG. 1.

The alternative embodiment shown in FIG. 2 is essentially the same as that described above, but a different method of coupling the body 8 to the optical input is used. As in the previous case, two opposite, parallel faces of the body 8 are provided with electrical contacts 9 and 10, but no diffused regions are required. The contacts 9 and 10 are connected to the D.C. bias source 11. Two intense light beams 12 and 13 of slightly differing frequencies $f_1$ and $f_2$ respectively are directed at the surface 14 of the body 8. If the respective angles of incident $\theta_1$ and $\theta_2$ of the light beams 12 and 13 are adjusted in accordance with the formula $$\frac{V_p}{c} = \frac{\omega_1 - \omega_2}{\omega_1 \sin \theta'_1 + \omega_2 \sin \theta'_2}$$

(where $V_p$ is the velocity of the difference frequency in the crystal, $c$ is the velocity of light in the crystal, $\omega_1$ and $\omega_2$ are the respective optical frequencies and $\theta'_1$ and $\theta'_2$ are the internal angles corresponding to the external angles $\theta_1$ and $\theta_2$ when modified by the indices of refraction of the crystal), then a difference frequency photocurrent is developed in the body with a phase velocity comparable to the acoustic velocity. If the D.C. bias field is present this difference frequency phase is also comparable to the velocity of the drifting charge carriers. Any modulation of either of the light beams 12 or 13 causes a corresponding modulation of the difference frequency photocurrent, which excites the growing acoustic wave in the same manner as in the previous embodiment. Again, a suitable acoustic transducer 15 is used to couple out the amplified acoustic wave in a manner described hereinabove with respect to transducer 7 in FIG. 1.

Other examples of piezoelectric semiconductor materials are gallium arsenide (GaAs) and cadmium selenide (CdSe).

What we claim is:

1. Apparatus for the detection and amplification of a signal modulating an optical frequency carrier wave including a single crystal body of piezoelectric semiconductor material having at least one pair of parallel faces, means for applying a direct current bias potential between the two faces, means for coupling to one of the faces of the body of piezoelectric semiconductor material the modulated optical carrier wave, whereby the interaction between the wave and the body of piezoelectric semiconductor material produces within the material a photocurrent corresponding to the modulating signal and an acoustically responsive output transducer coupled to the body of piezoelectric semiconductor material to produce an acoustic output corresponding to the modulating signal.

2. Apparatus according to claim 1 wherein the body of piezoelectric semiconductor material includes a depletion layer formed in one of the parallel faces of the body and the acoustically responsive output transducer is coupled to the other parallel face, and the modulated optical carrier wave is incident on and normal to the depletion layer, so that a photocurrent proportionate to the input signal is developed in the body with a phase velocity comparable to the acoustic velocity.

3. Apparatus according to claim 1 wherein the body of piezoelectric semiconductor material includes a p-i-n junction formed in one of the parallel faces of the body and the acoustically responsive output transducer is coupled to the other parallel face, and the modulated optical carrier wave is incident on and normal to the junction, so that a photocurrent proportionate to the input signal is developed in the body with a phase velocity comparable to the acoustic velocity.

4. Apparatus according to claim 3 in which the parallel face containing the p-i-n junction is provided with a transparent electrical contact.

5. Apparatus according to claim 3 in which the acoustically responsive output transducer is a quartz rod acoustically bonded to the parallel face opposite to that containing the p-i-n junction.

6. Apparatus according to claim 5 in which the quartz rod is a resonant element in which piezoelectric charges are induced by the acoustic wave.

7. Apparatus according to claim 5 in which the free end of the quartz rod is arranged to modulate a microwave cavity.

8. Apparatus according to claim 1 wherein the modulated optical carrier wave is directed on to a surface of the body of the piezoelectric semiconductor material together with a second optical carrier wave, the two carrier waves having different frequencies and being incident on the surfaces of the body at different angles so that a difference frequency photocurrent is developed in the body with a phase velocity comparable to the acoustic velocity and the velocity of the drifting charge carriers of the direct current bias field.

9. Apparatus according to claim 8 in which the acoustically responsive output transducer is a quartz rod acoustically bonded to a face normal to the direction of propagation of the acoustic wave.

10. Apparatus according to claim 9 in which the quartz rod in a resonant element in which piezoelectric charges are induced by the acoustic wave.

11. Apparatus according to claim 9 in which the free end of the quartz rod is arranged to modulate a microwave cavity.

12. Apparatus according to claim 8 in which the piezoelectric semiconductor material is selected from the group consisting of cadmium sulphide, gallium arsenide and cadmium selenide.

13. Apparatus according to claim 3 in which the parallel face containing the p-i-n junction is provided with a semi-transparent electrical contact.

14. Apparatus according to claim 2 in which the parallel face containing the depletion layer is provided with a transparent electrical contact.

15. Apparatus according to claim 2 in which the parallel face containing the depletion layer is provided with a semi-transparent electrical contact.

16. Apparatus according to claim 2 in which the acoustically responsive output transducer is a quartz rod acoustically bonded to the parallel face opposite to that containing the depletion layer.

17. Apparatus according to claim 16 in which the quartz rod is a resonant element in which piezoelectric charges are induced by the acoustic wave.

18. Apparatus according to claim 16 in which the free end of the quartz rod is arranged to modulate a microwave cavity.

19. Apparatus according to claim 1 in which the piezoelectric semiconductor material is selected from the group consisting of cadmium sulphide, gallium arsenide and cadmium selenide.

References Cited

UNITED STATES PATENTS

| 2,790,088 | 4/1957 | Shive | 330—33 X |
| 2,794,863 | 6/1957 | Van Roosbroeck | 330—33 |
| 3,121,203 | 2/1964 | Heywang | 332—52 |
| 3,164,665 | 1/1965 | Stello. | |
| 3,183,359 | 5/1965 | White | 332—3 X |

ROY LAKE, *Primary Examiner.*

ALFRED L. BRODY, NATHAN KAUFMAN,
*Examiners.*